June 11, 1929.  A. J. FAUSEK ET AL  1,716,722
VALVE
Filed March 23, 1925
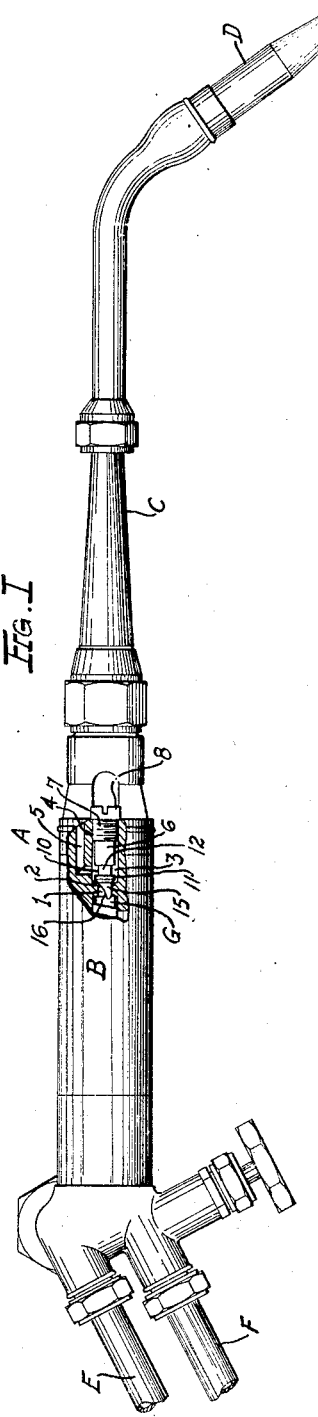
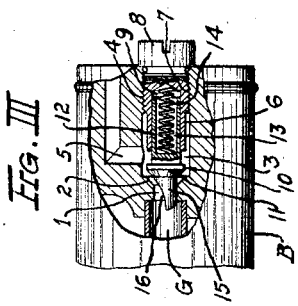
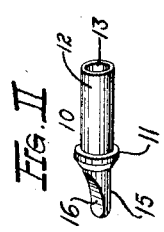
INVENTORS
A. J. FAUSEK
I. F. FAUSEK
BY *Cook & McCauley*
ATTORNEYS Patented June 11, 1929.

1,716,722

UNITED STATES PATENT OFFICE.

ARTHUR J. FAUSEK AND IRWING F. FAUSEK, OF ST. LOUIS, MISSOURI.

VALVE.

Application filed March 23, 1925. Serial No. 17,676.

This invention relates generally to improvements in valves, and more specifically stated, the invention relates to a valve which is so constructed and arranged that the tendency of said valve to chatter when in use is eliminated.

It is well known that a decided effort has been made in the past few years to produce a non-chattering valve, but in so far as we are aware no entirely successful valve of this sort has ever been devised. The main object of the present invention therefore is to produce an exceedingly simple and inexpensive valve provided with means for preventing the chattering of said valve, which means is so arranged that the efficient operation of the valve is not in any way interfered with.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of a cutting or welding tool provided with one of our improved valves.

Fig. II is a perspective of a portion of our improved valves.

Fig. III is an enlarged fragmentary view of the tool shown in Fig. I, a portion of said fragment of said tool being broken away to show the valve therein.

For the purpose of illustrating the application of our improved valve, we have shown in Fig. I of the drawing a torch A of a type used for welding or cutting metals. The torch A comprises the usual handle B, mixing chamber C and nozzle D, and E and F designate individual conductors through which the elements of the combustible are conducted to the torch.

Arranged in the handle B of the torch is a passageway G through which a fluid passes, and this passageway is provided with a reduced portion 1 having a valve seat 2. 3 designates an elongated opening which is arranged in alinement with the passageway G but at the opposite side of the reduced portion 1. The elongated opening 3 is provided with screw threads 4 at one of its ends. Arranged in communication with the elongated opening 3 is a passageway 5 which extends to the discharge end of the nozzle D of the torch. In torches of the type illustrated in the drawing the elements of the combustible pass through the conductors E and F into the handle of the torch, and through said handle to the mixing chamber where they are commingled to produce a combustible which is ignited as it is discharged from the nozzle D. Torches of the sort described are usually provided with check valves to control the passage of the fluid through the passageways within the torch and in Fig. I we have shown a valve constructed in accordance with our invention associated with one of said torches. It is to be understood, however, that we have shown the torch A merely to illustrate one application of our invention, it being plain that our valve may be used with a great number of devices totally foreign to metal cutting and welding torches.

6 designates a member which is provided with screw threads 7 whereby said member may be screwed into the elongated opening 3 as shown clearly in Fig. III. The member 6 is provided at one of its ends with a head 8, having a slot for the reception of a screw driver or similar tool whereby said member may be rotated and a recess 9 at its opposite end. Associated with the member 6 is a member 10 which comprises a valve head 11 and a stem portion 12. The stem portion 12 is provided with a recess 13 which extends from the end of said stem portion some distance thereinto, as shown in Fig. III, and said stem portion 12 is arranged within the recess 9 of the member 6. Interposed between the bottom wall of the recess 9 in the member 6 and the bottom wall of the recess 13 in the stem portion 12 of the member 10 is an expansible coil spring 14. By referring to Fig. III, it will be seen that the coil spring 14 is so arranged that its tendency is to cause the valve head 11 to be forced onto its seat 2, and it is equally plain that in the event fluid within the passage G exerts sufficient pressure against the valve head to overcome the pressure of the spring 14, said valve head will be unseated. Considering only what we have described thus far, we have an example of a valve which would be very likely to chatter when fluid is forced through it. It is very apparent that there must be enough play between the wall of the recess 9 and the outer face of the stem portion 12 to permit free longitudinal movement of said stem portion relative to said wall of recess 9, and when this play is present an opportunity is provided for the chattering of the valve caused by the lateral movement thereof.

To eliminate any tendency of the valve head 11 shown in Figs. I and III to chatter, we provide the valve head 11 with a comparatively short stem 15 which extends in a direction opposite to the stem portion 12. The stem 15 extends into the reduced portion 1 of the passageway 6 and the radius of the outer face of said stem is approximately the same as the radius of the wall of said reduced portion 1. The stem 15 is provided with a face 16 which is preferably concave, though it may be of other shapes, this face being formed by cutting a portion of the stem away, or by forming said stem without said portion. The face 16 is approximately as wide as the stem 15, as suggested by Fig. II.

In the use of a valve made in accordance with our invention, fluid passing through the pasageway G will strike the concave face 16 of the stem 15. The action of the fluid striking the concave face 16 will cause the outer curved wall of the stem 15 to be forced firmly against the wall of the reduced portion 1 of the passageway G in which position said stem will be maintained as long as any fluid is passing through the passageway. It is therefore plain that the fluid cams the stem 15 laterally in the reduced portion 1 of the passageway G and holds it in a fixed lateral position so that the associated valve head will be prevented from chattering. In other words, the element which formerly caused valves to chatter, namely, the fluid in connection with our improved valve, functions to prevent chattering of said valve.

We claim:

1. A valve comprising a housing having a fluid pasageway, a valve seat, a valve head located within said pasageway, said valve head being of less diameter than said passageway, to permit passage of fluid between the wall of said passageway and the face of said valve head, and said valve head being movable toward and away from said valve seat, and means to prevent chattering of said valve head, said means comprising a reduced stem projection, formed on the valve seat, having an oblique face formed thereon against which the fluid passing through the fluid passageway moves, whereby said stem is forced firmly against the wall of said passageway to prevent lateral movement of said stem and said valve head.

2. A valve comprising a housing having a fluid passageway provided with a reduced portion, a valve seat, a valve head located within said passageway, said valve head being of less diameter than said passageway, to permit passage of fluid between the wall of said passageway and the face of said valve head, and said valve head being movable toward and away from the valve seat, and means to prevent chattering of the valve head within the valve seat, said means comprising a stem on said valve head arranged to extend into the reduced portion of the fluid passageway, said stem being provided with a face against which the fluid passing through said fluid passageway moves whereby said stem is forced firmly against the wall of said reduced portion of said passageway to prevent lateral movement of said stem and said valve head.

3. A valve comprising a housing having a fluid passageway provided with a reduced portion, a valve seat, a valve head located within said passageway, said valve head being of less diameter than said fluid passageway, to permit passage of fluid between the wall of said passageway and the face of said valve head, said valve head being movable toward and away from said valve seat, and means to prevent vibration of said valve head, said means comprising a stem on said valve head arranged to extend into said reduced portion of said fluid passageway, said stem being provided with a curved face against which the fluid passing through said fluid passageway moves whereby said stem is forced firmly against the wall of said reduced portion of said passageway to prevent lateral movement of said stem and said valve head.

In testimony that we claim the foregoing we hereunto affix our signatures.

ARTHUR J. FAUSEK.
IRWING F. FAUSEK.